(12) United States Patent
Filipenko

(10) Patent No.: US 11,563,362 B2
(45) Date of Patent: Jan. 24, 2023

(54) ROTATING ELECTRICAL MACHINE AND AIRCRAFT HAVING SAID MACHINE

(71) Applicant: Rolls-Royce Deutschland Ltd & Co KG, Blankenfelde-Mahlow (DE)

(72) Inventor: Mykhaylo Filipenko, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 227 days.

(21) Appl. No.: 16/966,820

(22) PCT Filed: Jan. 23, 2019

(86) PCT No.: PCT/EP2019/051579
§ 371 (c)(1),
(2) Date: Jul. 31, 2020

(87) PCT Pub. No.: WO2019/149587
PCT Pub. Date: Aug. 8, 2019

(65) Prior Publication Data
US 2021/0044188 A1    Feb. 11, 2021

(30) Foreign Application Priority Data
Feb. 2, 2018   (DE) .................. 10 2018 201 610.0

(51) Int. Cl.
*H02K 16/04*   (2006.01)
*H02K 1/16*   (2006.01)
(Continued)

(52) U.S. Cl.
CPC .............. *H02K 16/04* (2013.01); *B64D 27/24* (2013.01)

(58) Field of Classification Search
CPC ............. H02K 16/04; H02K 1/16; H02K 1/18
(Continued)

(56) References Cited

U.S. PATENT DOCUMENTS

2012/0133228 A1* 5/2012 Chen ..................... H02K 23/56
                                                          310/154.01
2014/0159532 A1    6/2014 Kondou

FOREIGN PATENT DOCUMENTS

CN          103647382 A       3/2014
CN          104201848 A  *  12/2014
(Continued)

OTHER PUBLICATIONS

German Search Report for German Application No. 10 2018 201 610.0 dated Aug. 13, 2018.
(Continued)

*Primary Examiner* — Jose A Gonzalez Quinones
(74) *Attorney, Agent, or Firm* — Lempia Summerfield Katz LLC

(57) ABSTRACT

The invention relates to a rotating electrical flux-switching machine, comprising a rotatable tubular rotor (2), an inner first stator (3), and an outer second stator (4) that is concentric and spaced apart relative to the first stator (3), wherein the rotor (2) is arranged concentrically relative to the first and second stator (3, 4) and is arranged between the first and the second stator (3, 4) in such a way that a first air gap (10) is formed between the first stator (3) and the rotor (2), and a second air gap (11) is formed between the second stator (4) and the rotor (2). The invention also relates to an aircraft comprising a rotating electrical machine of this type.

19 Claims, 3 Drawing Sheets

(51) Int. Cl.
   *H02K 1/18*     (2006.01)
   *B64D 27/24*   (2006.01)
(58) Field of Classification Search
   USPC .............................. 310/114, 156.35, 156.37
   See application file for complete search history.

(56) References Cited

FOREIGN PATENT DOCUMENTS

| CN | 104300755 A | * | 1/2015 | |
|---|---|---|---|---|
| CN | 105375715 A | | 3/2016 | |
| CN | 106787609 A | * | 5/2017 | |
| CN | 106849567 A | | 6/2017 | |
| CN | 107425687 A | | 12/2017 | |
| DE | 102011121174 A1 | | 6/2013 | |
| EP | 2413482 A1 | * | 2/2012 | ............. H02K 16/04 |
| EP | 2770616 A1 | | 8/2014 | |
| RU | 2356155 C1 | * | 5/2009 | |
| SU | 1141528 A | * | 2/1985 | |

OTHER PUBLICATIONS

International Search Report and the Written Opinion for International Patent Application PCT/EP2019/051579 dated Apr. 23, 2019.

* cited by examiner

ROTATING ELECTRICAL MACHINE AND AIRCRAFT HAVING SAID MACHINE

This application is the National Stage of International Application No. PCT/EP2019/051579, filed Jan. 23, 2019, which claims the benefit of German Patent Application No. 10 2018 201 610.0, filed Feb. 2, 2018. The entire contents of these documents are hereby incorporated herein by reference.

FIELD

The present embodiments relate to a rotating electric machine and an aircraft having a rotating electric machine.

BACKGROUND

For many technical applications, rotating electric machines with a high power-to-weight ratio (kW/kg) have a major advantage. Some applications could be made possible for the first time if rotating electric machines could be constructed with a high power-to-weight ratio. One example is the electrification of air travel using generators or electric motors. In this case, a power-to-weight ratio of at least 10 kW/kg is to be provided (e.g., Halbach arrays).

Configurations with a double rotor may be electromagnetically advantageous because such configurations permit both a very great magnetic flux density in the air gap and also optimally utilize the magnetic circuit, as a rotor is utilized for generation and flux guidance of the magnetic flux on both sides of the stator.

Using oriented magnets (e.g., Halbach arrays) on both sides, the magnetic flux density is configured so as to be radially highly homogeneous. As a result of this, it is possible to omit a flux-guiding material in the stator. This makes the stator lighter or provides that more copper may be used instead of iron. The rotating electric machine has greater efficiency owing to reduced copper and iron losses.

Although this configuration offers electromagnetic advantages, the structural and mechanical design is complex. For this reason, such rotating electric machines have hitherto not been widely used.

Radial double rotor configurations are commonly realized with a "bell rotor", as illustrated in FIG. 1. FIG. 1 shows a U-shaped stator 1 with coils 6, and a rotor 2 that is arranged rotatably within the stator 1 and has magnets 5. The rotor 2 is situated on a shaft 17 that is arranged in the bearings 16. A first air gap 10 and a second air gap 11 are situated between the coils 6 of the stator 1 and the magnets 5 of the rotor 2. An electric machine of this type is described in detail in German Patent Application No. DE 10 2012 217 363 A1.

The major disadvantage of this construction is that, owing to the magnetic attraction forces, high bending moments arise, which are to be absorbed by a heavy mechanical structure. The advantages of the electromagnetic design are thus diminished.

The disadvantage of such machines is that rotors in such a design are commonly associated with problems in terms of rotor dynamics, which, specifically in the case of applications in the aerospace sector, where the shaft and the rotor are subjected to recurring gyroscopic moments that arise owing to flight maneuvers, may lead to unpredicted failures.

SUMMARY AND DESCRIPTION

The scope of the present invention is defined solely by the appended claims and is not affected to any degree by the statements within this summary The present embodiments may obviate one or more of the drawbacks or limitations in the related art. For example, a rotating electric machine with a double gap, which has an improved power-to-weight ratio, is provided.

The present embodiments include a construction for a rotating electric machine. The electric machine is configured as a flux switching machine. This provides that both permanent magnets, which serve for magnetic flux generation, and coils, in which a voltage is induced or fed in, are situated in a stator. The flux change is generated by the rotor being formed from a ferromagnetic but non-magnetized material. It is thus made possible to conduct the magnetic flux but also interrupt the magnetic flux again (e.g., flux switching).

The flux switching machine is also referred to as a "hybrid machine", because the flux switching machine constitutes a synthesis of a permanently excited synchronous machine and a reluctance machine. A hybrid machine of the type is described, for example, in German Patent Application No. DE 10 2011 121 174 A1.

One or more of the present embodiments have two air gaps, where the rotor is, however, formed as a single "tube" that has ferromagnetic and non-ferromagnetic material in alternation in a circumferential direction.

The stator includes magnets and coils on a rotor outer side, and the magnetic circuit is closed on a rotor inner side by further magnets. The magnets may be formed as Halbach arrays. A Halbach array is a special arrangement of permanent magnets. Such an arrangement makes it possible for the magnetic flux to be virtually canceled out at one side of the arrangement, whereas the magnetic flux is amplified to a maximum extent on the other side.

In the rotor and in the stator, the ferromagnetic materials may be heavily segmented in order to realize a "Vernier machine", which permits even higher power densities.

The present embodiments make it possible to realize an electric machine with a high power density. The present embodiments include a flux switching machine with a double air gap and A Vernier flux switching machine with a double air gap. A double-gap machine is provided. The double-gap machine does not have the conventional problems of a double-rotor machine.

An advantage of the present embodiments lies in the complete elimination of the external bending moments, which leads to a slimming-down of the mechanical structure. In this way, double air gap configurations may impart electromagnetic advantages without being adversely affected by the mechanical construction.

A further advantage consists in that all of the magnets are situated in the stator, and thus, the magnet cooling may be realized similarly to the cooling of the stator coils into which the current is induced or fed.

In a normal stage of development, a power-to-weight advantage of approximately 30-40% may be expected, whereas even over 100% more power density may become possible in a second stage of development.

It is thus possible to produce electric machines with a power density of 10-12 kW/kg, whereby many applications (e.g., electric flight) are made possible for the first time, or other business sectors (e.g., generators for wind turbines) are sustainably improved.

The present embodiments include a rotating electric machine. The rotating electric machine includes a rotatable tubular rotor, an inner first stator, and an outer second stator that is spaced apart from and concentric with respect to the first stator. The rotor is arranged concentrically with respect to the first stator and the second stator, and between the first stator and the second stator such that: a first air gap is formed between the first stator and the rotor, and a second air gap is formed between the second stator and the rotor.

In one refinement, the first stator and the second stator may mechanically form a unit.

In a further embodiment, the rotor may have a ferromagnetic material and a non-magnetic material in alternation in a circumferential direction.

In a further configuration, the first stator may have first magnets, poles of which are oriented in a circumferential direction, and non-magnetic material in alternation in a circumferential direction.

In one refinement, the first magnets may be formed from Halbach arrays.

In a further embodiment, the second stator may have second magnets that are spaced apart from one another in a circumferential direction. Poles of the second magnets are oriented in a circumferential direction.

In a further embodiment, the second magnets may be formed from Halbach arrays.

In a further embodiment, coils may be arranged below the poles of adjacent second magnets. Poles of the coils are oriented in the direction of the rotor.

The coils may be excited in a phase-offset manner by an alternating current such that the rotor is set in rotational motion.

The rotor may be mechanically set in rotational motion such that an alternating current is induced in the coils.

In a further embodiment, the ferromagnetic material may be iron or an iron alloy.

In a further embodiment, the stator and the rotor are segmented in a filigree manner with a high number of poles, such that a Vernier machine is thereby realized.

The present embodiments also include an aircraft having a rotating electric machine according to an embodiment. The rotating electric machine is an electric motor that drives a propulsion unit.

DETAILED DESCRIPTION

Figure 1:
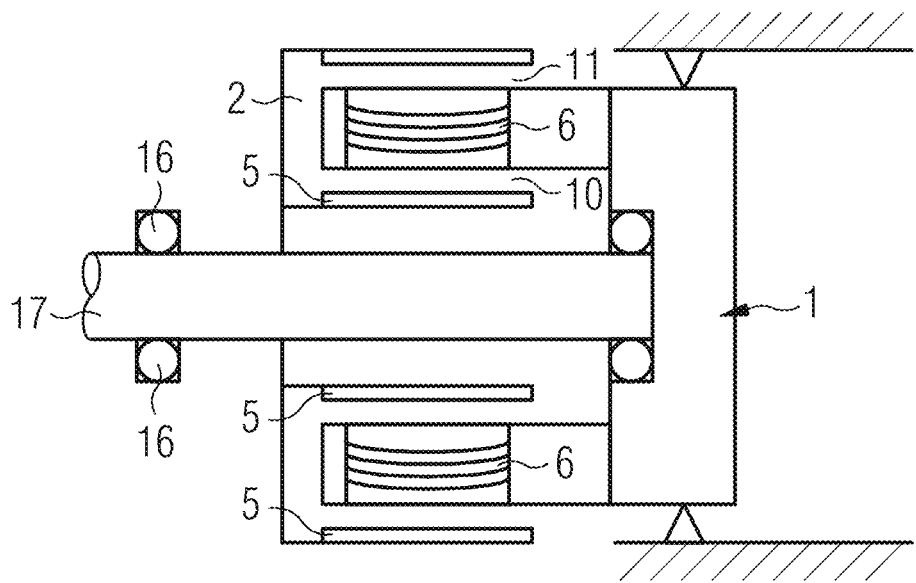
FIG. 1 shows a sectional view of a rotating electric double-rotor machine according to the prior art.
Figure 2:
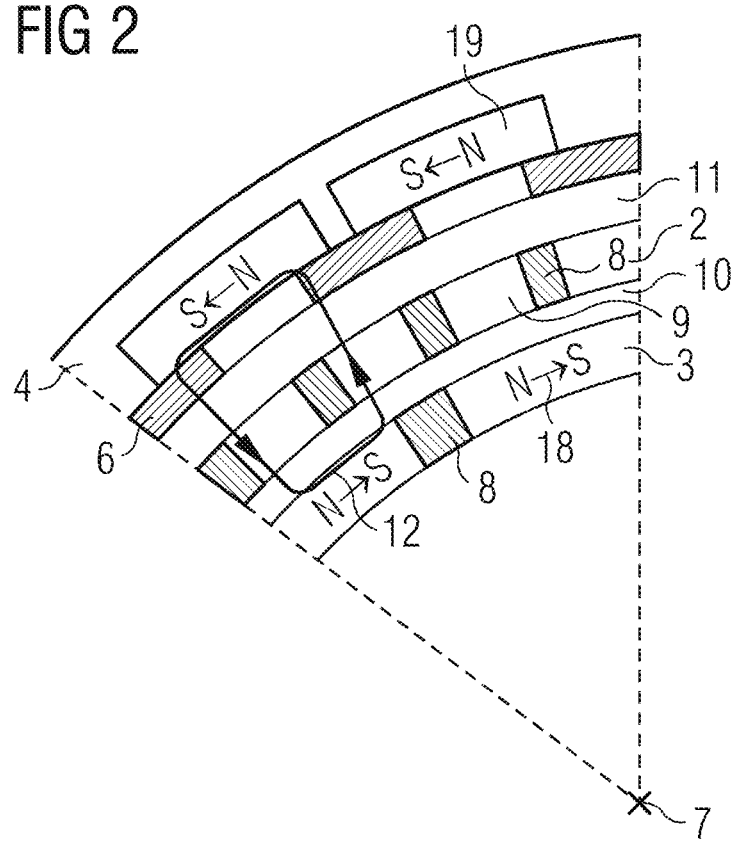
FIG. 2 shows a sectional view through one embodiment of a rotating electric hybrid machine with a double air gap.

FIG. 2 shows a cross section through a part of a rotating electric machine, where an axis of rotation 7 of a rotor 2 projects out of the plane of the image. The rotor 2 is of tubular form and has a ferromagnetic material 9 and a non-magnetic material 8 in alternation in a circumferential direction. In other words, the rotor 2 forms a type of toothed ring, where the ferromagnetic material 9 forms the teeth. The rotor 2 lies concentrically between a ring-shaped inner first stator 3 (e.g., a first stator 3) and a ring-shaped second stator 4 (e.g., a second stator 4).

The first stator 3 has first magnets 18 that are arranged spaced apart from one another in a circumferential direction, where S and N poles of adjacent first magnets 18 face toward one another. The first magnets 18 may be formed as Halbach arrays.

The second stator 4 has second magnets 19 that are arranged spaced apart from one another in a circumferential direction, where S and N poles of adjacent second magnets 19 face toward one another. The second magnets 19 may likewise be formed as Halbach arrays. Coils 6 are positioned below (e.g., in the direction of the rotor 2) adjacent poles of the second magnets 19. A coil axis of the coils 6 points in the direction of the rotor 2. Through alternating excitation of the coils 6, a rotating magnetic field is generated. The generated rotating magnetic field sets the rotor 2 in rotational motion (e.g., forming an electric motor). FIG. 2 shows, by way of example, a magnetic flux 12. By rotation of the rotor 2, voltage is induced in the coils 6 in a phase-offset manner (e.g., forming a generator).

A first air gap 10 is situated between the rotor 2 and the first stator 3. A second air gap 11 is situated between the rotor 2 and the second stator 4. The ferromagnetic material 9 may, for example, be iron or an iron alloy, though the ferromagnetic material 9 may also be an alloy of rare earths, iron-nitrogen, or a sintered material.

Figure 3:
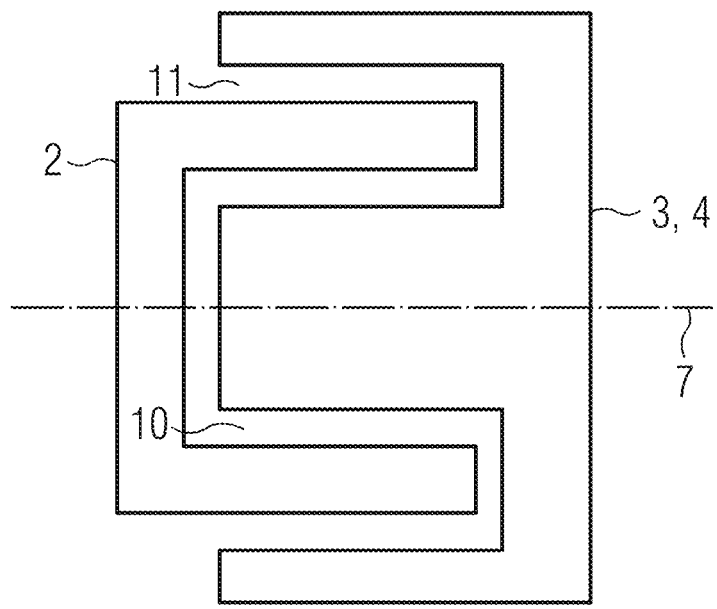
FIG. 3 shows a further sectional view through one embodiment of a rotating electric hybrid machine with a double air gap.
Figure 4:
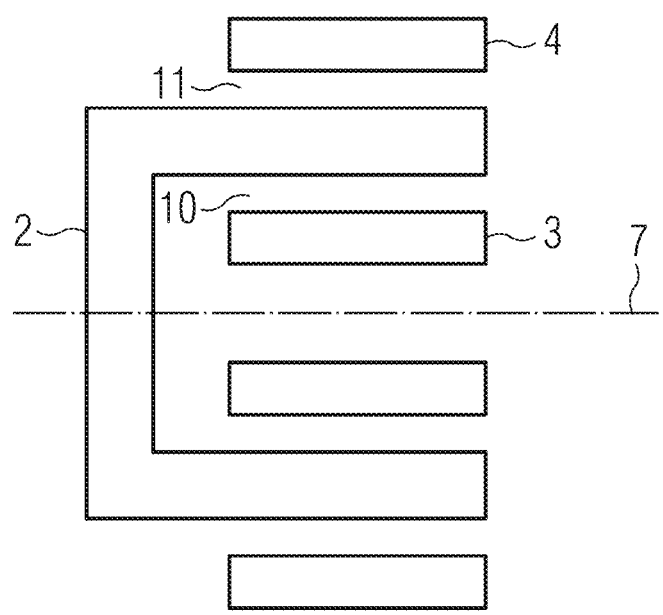
FIG. 4 shows a further sectional view through one embodiment of a rotating electric hybrid machine with a double air gap.

FIG. 3 and FIG. 4 show sectional views of different embodiments of the first stator 3 and the second stator 4, as per FIG. 2. The section plane has been selected as being perpendicular to the plane of the image in FIG. 2. First and second magnets 18, 19 and coils 6 are not illustrated.

FIG. 3 shows a single-part stator, in the case of which the first stator 3 and the second stator 4 are formed in one piece. FIG. 4 shows a multi-part stator, in the case of which the first stator 3 and the second stator 4 are not directly connected to one another. For example, the stators 3 and 4 may be fastened to a housing. The rotor 2 is also illustrated. It is also possible to see the first air gap 10 and the second air gap 11.

Figure 5:
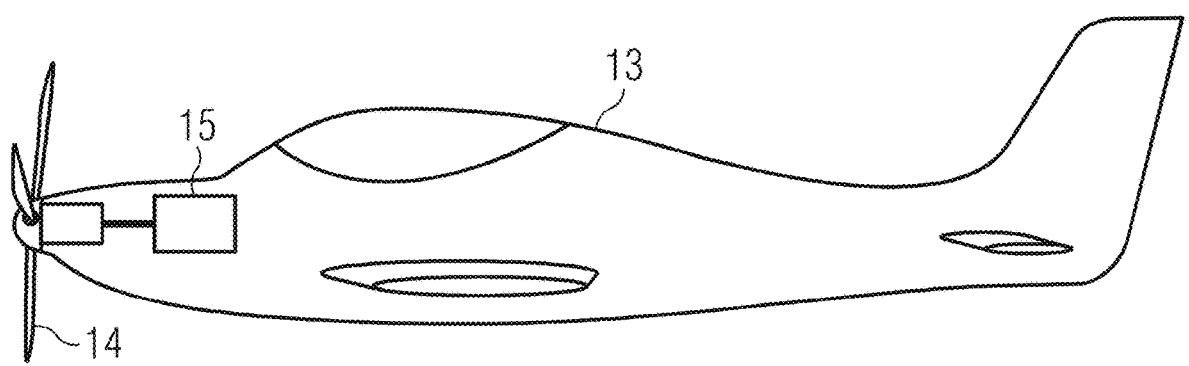
FIG. 5 shows one embodiment of an airplane with a rotating electric machine.

FIG. 5 shows an airplane 13 as an example of an aircraft in which a propulsion unit 14 (e.g., in the form of a propeller) is driven by an electric motor 15 configured correspondingly to the discussion above related to FIG. 2-4.

Although the invention has been described and illustrated more specifically in detail with reference to exemplary embodiments, the invention is not restricted by the disclosed examples; other variations may be derived therefrom by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A rotating electric machine comprising:
a rotatable tubular rotor;
an inner first stator; and an outer second stator that is spaced apart from and concentric with respect to the inner first stator, wherein the rotatable tubular rotor is arranged concentrically with respect to the inner first stator and the outer second stator, and between the inner first stator and the outer second stator such that:

a first air gap is formed between the inner first stator and the rotatable tubular rotor; and a second air gap is formed between the outer second stator and the rotatable tubular rotor, wherein the inner first stator has first magnets, poles of which are oriented in a first circumferential direction, and non-magnetic material in alternation in the first circumferential direction, wherein the outer second stator has second magnets that are spaced apart from one another in a second circumferential direction, poles of the second magnets being oriented in the second circumferential direction, and wherein coils are arranged below the poles of adjacent second magnets of the second magnets, respectively, a coil axis of coils being oriented in a direction of the rotatable tubular rotor.

2. The rotating electric machine of claim 1, wherein the inner first stator and the outer second stator mechanically form a single part.

3. The rotating electric machine of claim 1, wherein the rotatable tubular rotor has a ferromagnetic material and a non-magnetic material in alternation in a third circumferential direction.

4. The rotating electric machine of claim 1, wherein the first magnets are formed from Halbach arrays.

5. The rotating electric machine of claim 1, wherein the second magnets are formed from Halbach arrays.

6. The rotating electric machine of claim 1, wherein the coils are excitable in a phase-offset manner by an alternating current such that the rotatable tubular rotor is set in rotational motion.

7. The rotating electric machine of claim 1, wherein the rotatable tubular rotor is mechanically settable in rotational motion such that an alternating current is induced in the coils.

8. The rotating electric machine of claim 3, wherein the ferromagnetic material is iron or an iron alloy.

9. The rotating electric machine of claim 1, wherein the rotating electric machine is configured as a Vernier machine, and wherein the inner first stator, the outer second stator, and the rotatable tubular rotor are segmented in a filigree manner with a number of poles.

10. An aircraft comprising:
a rotating electric machine comprising:
a rotatable tubular rotor;
an inner first stator; and
an outer second stator that is spaced apart from and concentric with respect to the inner first stator, wherein the rotatable tubular rotor is arranged concentrically with respect to the inner first stator and the outer second stator, and between the inner first stator and the outer second stator such that:

a first air gap is formed between the inner first stator and the rotatable tubular rotor; and a second air gap is formed between the outer second stator and the rotatable tubular rotor, wherein the inner first stator has first magnets, poles of which are oriented in a first circumferential direction, and non-magnetic material in alternation in a second circumferential direction, wherein the outer second stator has second magnets that are spaced apart from one another in a third circumferential direction, poles of the second magnets being oriented in a fourth circumferential direction, wherein coils are arranged below the poles of adjacent second magnets of the second magnets, respectively, a coil axis of coils being oriented in a direction of the rotatable tubular rotor, and wherein the rotating electric machine is an electric motor configured to drive a propulsion unit.

11. The aircraft of claim 10, wherein the inner first stator and the outer second stator mechanically form a unit.

12. The aircraft of claim 10, wherein the rotatable tubular rotor has a ferromagnetic material and a non-magnetic material in alternation in a fifth circumferential direction.

13. The aircraft of claim 10, wherein the first magnets are formed from Halbach arrays.

14. The aircraft of claim 10, wherein the second magnets are formed from Halbach arrays.

15. The aircraft of claim 10, wherein the coils are excitable in a phase-offset manner by an alternating current such that the rotatable tubular rotor is set in rotational motion.

16. The aircraft of claim 10, wherein the rotatable tubular rotor is mechanically settable in rotational motion such that an alternating current is induced in the coils.

17. The aircraft of claim 12, wherein the ferromagnetic material is iron or an iron alloy.

18. The aircraft of claim 10, wherein the rotating electric machine is configured as a Vernier machine, and wherein the inner first stator, the outer second stator, and the rotatable tubular rotor are segmented in a filigree manner with a number of poles.

19. The rotating electric machine of claim 1, wherein the coils are coils of the outer second stator.

* * * * *